UNITED STATES PATENT OFFICE.

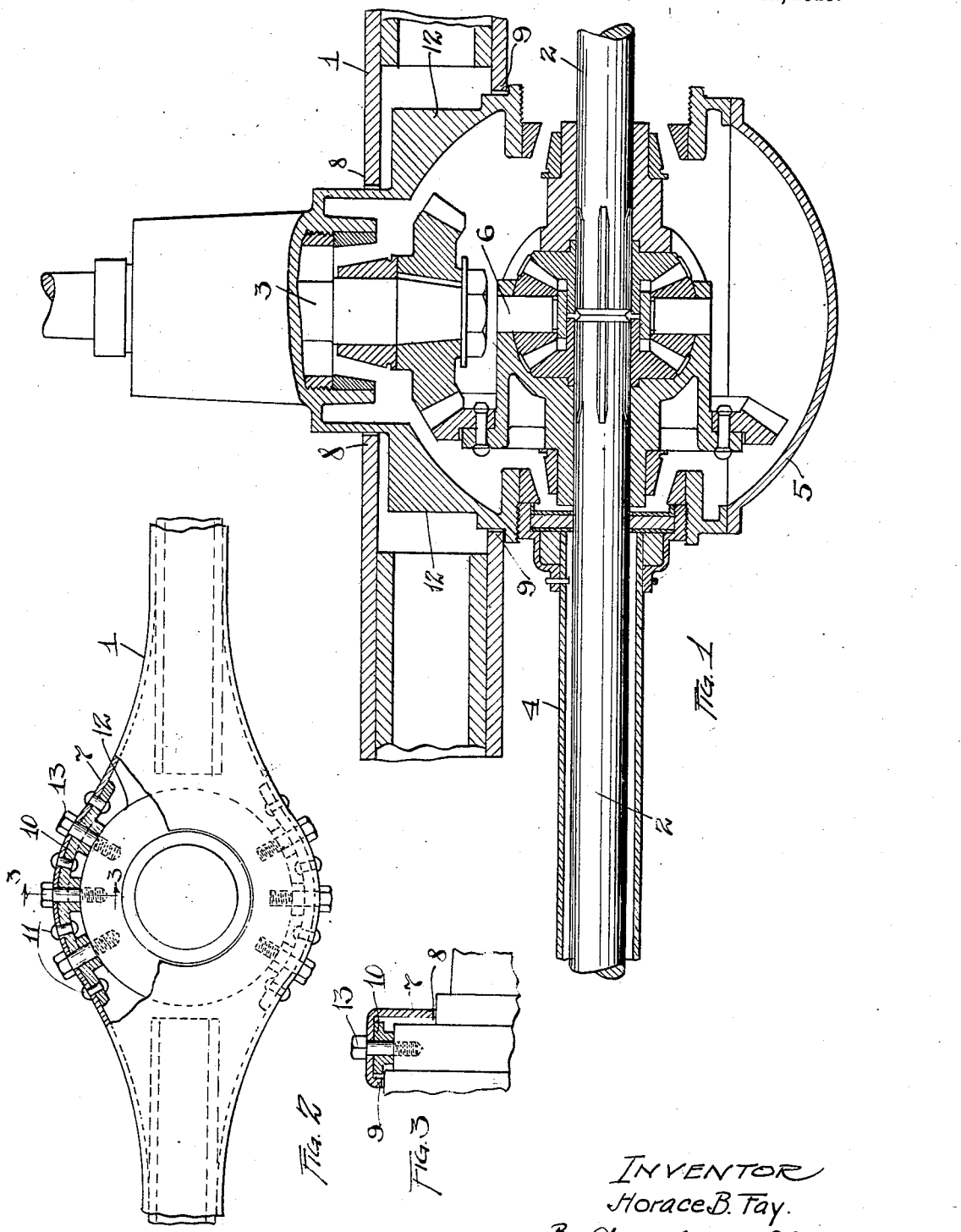

HORACE B. FAY, OF WILLOUGHBY, OHIO, ASSIGNOR TO THE COLUMBIA AXLE COMPANY, OF CLEVELAND, OHIO, A CORPORATION OF OHIO.

AXLE.

1,318,856.  Specification of Letters Patent.  Patented Oct. 14, 1919.

Application filed October 18, 1917. Serial No. 197,181.

*To all whom it may concern:*

Be it known that I, HORACE B. FAY, a citizen of the United States, and a resident of Willoughby, Ohio, county of Lake, and State of Ohio, have invented a new and useful Improvement in Axles, of which the following is a specification, the principle of the invention being herein explained and the best mode in which I have contemplated applying that principle, so as to distinguish it from other inventions.

The present invention, relating, as indicated, to axle construction, is particularly concerned with an axle of the type commonly known as an internal drive axle, in which the load is supported upon one member designed particularly for that purpose, and the drive is communicated to the wheels through other members, which are supported upon the load-carrying member. One object of the present invention is to provide an axle of this type which is of simple construction and of greater strength than those now generally in use. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a plan view partially in section of my improved axle; Fig. 2 is a front elevation of the same showing the engagement between the load-carrying member and the driving members; and Fig. 3 is a section on the line 3—3, Fig. 2.

Referring now to Fig. 1, in which the general arrangement of parts is shown, there being a load-supporting axle 1 on the ends of which may be mounted the wheels of the vehicle, although these are not shown in the drawings, as the general construction of such an axle is of course well known. Behind this load-carrying axle 1 is mounted the driving axle consisting of shafts 2 operating from a driving shaft 3 at right angles thereto. The shafts 2 are suitably mounted in a tubular casing 4 fitting into a central inclosing casing 5, which incloses the inner ends of the shafts 2 and also the differential mechanism 6 between the driving shaft 3 and the axle 2. It has been found desirable in internal drive axles to mount the driving members and the differential behind the load-supporting member, which is the construction followed in my improved axle.

It has also been found that a stronger and cheaper load-supporting member can be made from a tubular housing than from a solid I-beam, since an I-beam is constructed for strength in a vertical plane only, whereas a tubular housing is of equal strength in all planes. The particular features of the present invention to which I wish to call attention are the central or enlarged portion 7 of the tubular housing member and the method of engagement between this member and the differential casing. This construction is indicated in Figs. 2 and 3, from which it will be seen that the central portion of the housing is provided with but one flange of any depth, this flange 8 extending downward toward the front of the differential casing. There is, however, no contact between either the front flange of the housing or the narrow rear flange 9, both of them being spaced from the casing at all points. Mounted within the housing, between the flanges 7 and 8, is a plate 10 curved to fit the inside of the central portion of the housing and secured thereto by a plurality of fastening devices, such as rivets 11. Two of these filling plates are used, one against the top and one against the bottom of the housing, and the filling plate when mounted in position is faced off to provide a smooth curved surface, against which may be received a similar part 12 formed on the differential casing. The differential casing formed on this extending portion 12 is also formed with a smooth, curved surface adapted to engage snugly against the inner surface of the filling blocks 10, and for convenience of assembly and tightness the outer face of this projecting portion 12 on the casing may be machined to provide a tight fit against the filling plates 10. When the differential casing is mounted in position within the enlarged central portion of the housing it is secured thereto by means of a plurality of radial bolts 13 passed through suitable holes drilled in the housing and in the filling plates 10 and tapped into the extending portion 12 on the casing.

My improved axle has been found to be of an extremely strong construction which may be manufactured and assembled at relatively low cost since there is but one machine surface between the differential casing and the housing itself. For the same reason it is a simple matter to assemble the two parts of the entire axle, that is, the load-carrying member and the casing and tubes which carry the driving parts.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a tubular axle having an enlarged portion intermediate its ends provided with alined openings, a gear casing mounted on one side of said axle and extending into such openings, and fastening means extending through said casing and the top and bottom of such enlarged portions of said housing, said means securing said casing firmly to said housing.

2. In a device of the character described, the combination of a tubular axle having an enlarged portion intermediate its ends provided with alined openings, a gear casing mounted on one side of said axle and extending into such openings, filling blocks mounted within such enlarged portion of said axle, and adapted to receive said casing thereon, and fastening means extending through said axle, said filling blocks and said casing, said means securing the same together.

3. In a device of the character described, the combination of a tubular axle having an enlarged portion intermediate its ends provided with alined concentric openings, a gear casing mounted on one side of said axle and extending into such openings, filling blocks mounted within such enlarged portion of said axle, an extending portion on said casing adapted to fit snugly within said filling blocks, and means adapted to secure said casing in such engagement.

4. In a device of the character described, the combination of a tubular axle having an enlarged portion intermediate its ends provided with an opening in one face thereof, a gear casing mounted on one side of said axle and extending into such opening, and fastening means extending through said axle in the plane of the greatest transverse dimension thereof, said means engaging said casing and securing the same firmly to said axle.

5. In a device of the character described, the combination of a tubular axle having an enlarged portion intermediate its ends provided with alined openings in opposite sides thereof, a differential carrying member mounted at one side of said axle and extending into said openings, and fastening means extending through said axle and engaging such carrying member, said means lying normal to the plane of the differential in said member.

6. In a device of the character described, the combination of a tubular axle having an enlarged portion intermediate its ends provided with alined openings in opposite sides thereof, a differential carrying member extending into said openings and lying in spaced relation within said tubular axle, filling means interposed between said axle and carrying member, and fastening means engaging said axle, filling means and carrying member and securing the same rigidly together.

Signed by me, this 16th day of October, 1917.

HORACE B. FAY.

Copies of this patent may be obtained for five cents each, by addressing the "Commissioner of Patents, Washington, D. C."